(12) United States Patent
Amano et al.

(10) Patent No.: US 9,020,692 B2
(45) Date of Patent: *Apr. 28, 2015

(54) DIAGNOSTIC APPARATUS AND DIAGNOSTIC METHOD OF HYBRID VEHICLE

(71) Applicant: Honda Motor Co., Ltd., Tokyo (JP)

(72) Inventors: Masato Amano, Utsunomiya (JP); Yuki Oshitani, Utsunomiya (JP); Yutaka Tsuji, Utsunomiya (JP); Atsushi Izumiura, Utsunomiya (JP); Akihiro Shinjo, Haga-gun (JP); Keisuke Minatoya, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/979,113

(22) PCT Filed: Nov. 19, 2012

(86) PCT No.: PCT/JP2012/079961
§ 371 (c)(1),
(2) Date: Jul. 10, 2013

(87) PCT Pub. No.: WO2013/088914
PCT Pub. Date: Jun. 20, 2013

(65) Prior Publication Data
US 2014/0067200 A1 Mar. 6, 2014

(30) Foreign Application Priority Data
Dec. 12, 2011 (JP) .................. 2011-271159

(51) Int. Cl.
*G06F 11/30* (2006.01)
*G06C 5/00* (2006.01)
(Continued)

(52) U.S. Cl.
CPC .............. *G07C 5/0808* (2013.01); *B60L 3/12* (2013.01); *B60K 6/442* (2013.01); *B60K 6/52* (2013.01);
(Continued)

(58) Field of Classification Search
USPC ........... 701/29.4, 31.7, 32.1, 32.7, 32.8, 33.4, 701/33.5, 33.6, 33.9, 34.2
See application file for complete search history.

(56) References Cited

U.S. PATENT DOCUMENTS 5,485,374 A  1/1996 Takaku et al.
6,276,472 B1 * 8/2001 Takashima et al. ........ 180/65.21
(Continued)

FOREIGN PATENT DOCUMENTS

CN  1279176 A  1/2001
CN  1774643 A  5/2006
(Continued)

OTHER PUBLICATIONS

International Search Report issued PCT/JP2012/079961, mailed Jan. 22, 2013, 3 pages.
(Continued)

*Primary Examiner* — Tuan C. To
*Assistant Examiner* — Dale W Hilgendorf
(74) *Attorney, Agent, or Firm* — Westerman, Hattori, Daniels & Adrian, LLP

(57) ABSTRACT

A diagnostic apparatus of a hybrid vehicle includes an internal combustion engine, an electricity storage device, a motor generating a driving force for a vehicle travel using at least electricity from the electricity storage device, a diagnostic unit diagnosing a vehicle state when an output of the internal combustion engine is zero, a state detection unit detecting a state of the electricity storage device, a remaining time acquisition unit acquiring a remaining time required until diagnostic completion, when the vehicle state is diagnosed by the diagnostic unit, a determination unit determining whether or not the diagnosis of the vehicle state is continued by the diagnostic unit, based on the state of the electricity storage device and the remaining time when the vehicle state is diagnosed by the diagnostic unit, and a control unit that controls continuation or stop of the vehicle state diagnosis according to the determination result.

9 Claims, 6 Drawing Sheets

(51) Int. Cl.
- *B60L 3/12* (2006.01)
- *G07C 5/08* (2006.01)
- *B60K 6/442* (2007.10)
- *B60K 6/52* (2007.10)
- *B60L 3/00* (2006.01)
- *B60L 11/14* (2006.01)
- *B60W 20/00* (2006.01)

(52) U.S. Cl.
CPC . *B60L 3/00* (2013.01); *B60L 11/14* (2013.01); *B60W 2510/244* (2013.01); *B60W 20/50* (2013.01); *Y02T 10/6234* (2013.01); *Y02T 10/6265* (2013.01)

(56) References Cited

U.S. PATENT DOCUMENTS

| | | | |
|---|---|---|---|
| 6,382,335 | B2 | 5/2002 | Takashima et al. |
| 2001/0009147 | A1 | 7/2001 | Takashima et al. |
| 2003/0106728 | A1 | 6/2003 | Kitajima et al. |
| 2004/0055304 | A1 | 3/2004 | Shimizu et al. |
| 2004/0261755 | A1 | 12/2004 | Segawa et al. |
| 2009/0299561 | A1 | 12/2009 | Matsumoto |
| 2010/0076635 | A1* | 3/2010 | Sugimoto ....................... 701/22 |
| 2011/0246009 | A1 | 10/2011 | Hase et al. |
| 2013/0218391 | A1* | 8/2013 | Aizawa et al. ................. 701/22 |
| 2013/0338867 | A1* | 12/2013 | Sato ............................... 701/22 |

FOREIGN PATENT DOCUMENTS

| | | | |
|---|---|---|---|
| EP | 0882887 | B1 | 2/2001 |
| JP | 2-33441 | A | 2/1990 |
| JP | 8-164827 | A | 6/1996 |
| JP | 2008-279823 | A | 11/2008 |
| JP | 4379407 | B2 | 12/2009 |
| JP | 2010-012897 | A | 1/2010 |
| JP | 2010-167899 | A | 8/2010 |
| JP | 2010-179712 | A | 8/2010 |
| WO | 2013/084705 | | 6/2013 |

OTHER PUBLICATIONS

International Search Report dated Jan. 22, 2013, issued in related International Application No. PCT/JP2012/079945.

Notice of Allowance dated Oct. 8, 2013, issued in related Japanese Patent Application No. 2013-513434, with English Translation (6 pages).

U.S. Office Action dated Feb. 28, 2014, issued in related U.S. Appl. No. 13/978,857 (15 pages).

Office Action dated Jan. 16, 2015, issued in corresponding Chinese Patent Application No. 201280005153.4, with English Translation of Search Report (7 pages).

* cited by examiner

DIAGNOSTIC APPARATUS AND DIAGNOSTIC METHOD OF HYBRID VEHICLE

CROSS REFERENCE TO RELATED APPLICATIONS

This application is a National Stage entry of International Application PCT/JP2012/079961 filed Nov. 19, 2012, which claims priority of Japanese Patent Application No. 2011-271159 filed Dec. 12, 2011, the disclosure of these prior applications are hereby incorporated in their entirety by reference.

TECHNICAL FIELD

The present invention relates to a diagnostic apparatus and a diagnostic method of a hybrid vehicle.

BACKGROUND ART

In the related art, for example, when an internal combustion engine is stopped during a vehicle stop or the like, a diagnostic apparatus is known in which the internal combustion engine is operated by driving a motor generator and thus a diagnosis is performed with respect to an opening degree of an EGR valve included in an exhaust gas recirculation apparatus (for example, refer to PTL 1).

CITATION LIST

Patent Literature

[PTL 1] Japanese Patent No. 4379407

SUMMARY OF INVENTION

Technical Problem

Incidentally, in the above-described diagnostic apparatus according to the related art, if a driver's accelerator operation is performed during a diagnostic performance, there is a case where the diagnosis is stopped, a power output from an internal combustion engine is started, and thus a diagnostic result obtained during the diagnosis is discarded.

In this case, when a next diagnosis is performed, the diagnosis is performed from the beginning, whereby energy required to drive the internal combustion engine using a motor generator during the diagnosis is uselessly wasted, and there is a possibility that the total time required for the diagnosis is increased, and thus distraction to the driver is increased.

An aspect according to the present invention is conceived in view of the above circumstances and is intended to provide a diagnostic apparatus and a diagnostic method of a hybrid vehicle which can prevent energy consumption required for a vehicle diagnosis from increasing and prevent distraction to an occupant due to the diagnostic performance increasing.

Solution to Problem

The present invention adopts the following aspects in order to achieve the object by solving the above-described problems.

An aspect according to the present invention includes an internal combustion engine; an electricity storage device; a motor that generates a driving force for vehicle travel using at least an electricity storage power of the electricity storage device; a diagnostic unit that diagnoses a vehicle state in a state where an output of the internal combustion engine is zero; a state detection unit that detects a state of the electricity storage device; a remaining time acquisition unit that acquires a remaining time required until a diagnostic completion, when the vehicle state is diagnosed by the diagnostic unit; a determination unit that determines whether or not the diagnosis of the vehicle state is continued by the diagnostic unit, when the vehicle state is diagnosed by the diagnostic unit, based on the state of the electricity storage device detected by the state detection unit and the remaining time acquired by the remaining time acquisition unit; and a control unit that controls continuation or stop of the vehicle state diagnosis according to a determination result of the determination unit.

An aspect according to the present invention is to provide a diagnostic method of a hybrid vehicle which includes an internal combustion engine, an electricity storage device, a motor that generates a driving force for a vehicle travel using at least an electricity storage power of the electricity storage device, a diagnostic unit that diagnoses a vehicle state in a state where an output of the internal combustion engine is zero, a state detection unit that detects a state of the electricity storage device, a remaining time acquisition unit that acquires a remaining time required until diagnostic completion, when the vehicle state is diagnosed by the diagnostic unit, a determination unit that determines whether or not the diagnosis of the vehicle state is continued by the diagnostic unit, based on the state of the electricity storage device detected by the state detection unit and the remaining time acquired by the remaining time acquisition unit, when the vehicle state is diagnosed by the diagnostic unit, a control unit that controls a continuation or a stop of the vehicle state diagnosis according to a determination result of the determination unit, and a required driving force detection unit that detects a required driving force of a driver. The method includes a step of acquiring a parameter with respect to the remaining time according to the state of the electricity storage device detected by the state detection unit, a step of acquiring a determination threshold value with respect to the required driving force according to the remaining time acquired by the remaining time acquisition unit and the parameter, and a step of determining whether to continue the diagnosis of the vehicle state using the diagnostic unit, in a case where the required driving force with the determination threshold value or less is detected by the required driving force detection unit.

When a vehicle state is diagnosed by a diagnostic unit in a state where an output of an internal combustion engine is zero, it is determined whether or not to continue the diagnosis by a complex determination based on a state of a storage device (at least a remaining amount, a temperature, a degradation degree or the like) and the remaining time required until diagnostic completion.

Therefore, compared with when the diagnosis is always stopped under a single proper condition, for example, only in a case where a required driving force with a predetermined lower limit value or more during the diagnosis is detected, for example only in a case where the remaining amount of the storage device is less than a predetermined value, or for example only in a case where the remaining time required until the diagnostic completion is longer than a predetermined time, necessity for re-diagnosis is prevented from occurring at the time of the next diagnosis, and energy consumption required for the diagnosis can be prevented from increasing.

Furthermore, when the diagnosis is performed, the internal combustion engine is automatically operated without requiring a driving operation of a driver, and thus the total time for performing the diagnosis is prevented from being prolonged due to the re-diagnosis, whereby it is possible to prevent a distraction to an occupant due to a diagnostic performance increasing, and to enhance merchantability.

The determination threshold value for determining whether or not to continue the diagnosis in a case where the required driving force is detected when the vehicle state is diagnosed is a value according to the parameter with respect to the remaining time and according to the remaining time required until the diagnostic completion which are according to the state of the storage device.

Therefore, it is possible to properly determine whether or not to continue the diagnosis, using the complex and easy determination based on the state of the storage device (at least the remaining amount, the temperature, the degradation degree, or the like) and the remaining time required until the diagnostic completion.

DESCRIPTION OF EMBODIMENTS

Hereinafter, a diagnostic apparatus of a hybrid vehicle and a diagnostic method of the hybrid vehicle according to an embodiment of the present invention will be described referring to the accompanying drawings.

Figure 1:
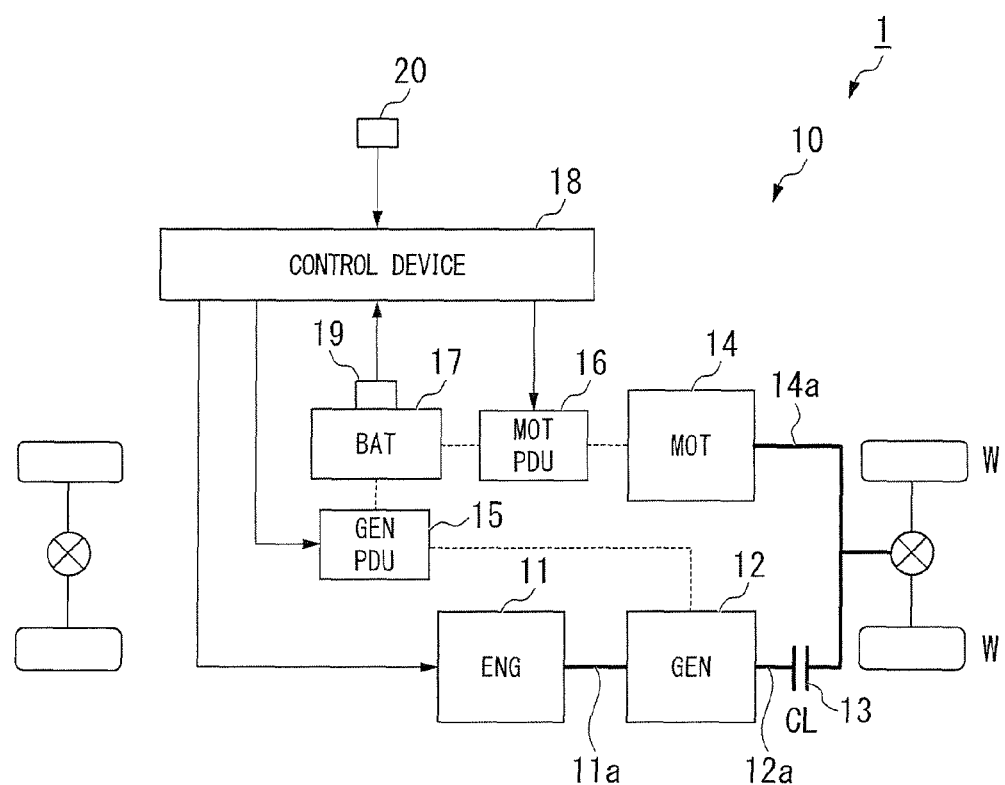
FIG. 1 is a configuration diagram of a diagnostic apparatus of a hybrid vehicle according to an embodiment of the present invention.

For example, the diagnostic apparatus 10 of the hybrid vehicle according to the present embodiment is mounted on the hybrid vehicle 1 illustrated in FIG. 1. For example, the hybrid vehicle 1 is a hybrid vehicle in which a rotation shaft 12a of a motor for power generation (GEN) 12 is connected to a crank shaft 11a of an internal combustion engine (ENG) 11, the rotation shaft 12a of the motor for power generation (GEN) 12 is connected to driving wheels W through a clutch (CL) 13, and a rotation shaft 14a of a motor for travel (MOT) 14 is connected to the driving wheels W.

Each motor 12 or 14 is a DC brushless motor or the like having a U phase, a V phase, and a W phase, and can perform a power running and a power generation driving.

For example, the motor for power generation 12 performs the power running by conducting each phase current of an alternate current to a coil of each phase, and in addition to performing either the driving of the internal combustion engine 11 or the driving wheels W, performs the power generation driving by receiving the driving force from the internal combustion engine 11, and outputs the generated power.

In addition, for example, the motor for travel (motor) 14 performs the power running by conducting each phase current of the alternate current to the coil of each phase, and in addition to performing the driving of the driving wheels W, performs the power generation driving (regeneration driving) by receiving the driving force from the driving wheels W side at the time of deceleration or the like of the hybrid vehicle 1 and outputs the generated power (regeneration power).

For example, the diagnostic apparatus 10 of the hybrid vehicle includes a power drive unit for power generation (GENPDU) 15 which controls an electrical conduction of the motor for power generation 12, a power drive unit for travel (MOTPDU) 16 which controls the electrical conduction of the motor for travel 14, a battery (BAT) 17, and a control device 18 (a diagnostic unit, a state detection unit, a remaining time acquisition unit, a determination unit, and a control unit, and a required driving force detection unit) as an electronic control unit (ECU) configured to have an electronic circuit such as a central processing unit (CPU).

For example, each PDU 15 or 16 is configured to include an inverter (not illustrated) which uses a pulse width modulation (PWM) and includes a bridge circuit formed by a bridge connection using multiple switching elements such as transistors.

The inverter includes the bridge circuit formed by the bridge connection using multiple switching elements (for example, IGBT: insulated gate bipolar mode transistor), and a smoothing capacitor which connects a positive terminal of the bridge circuit to a negative terminal of the bridge circuit. The bridge circuit is driven by a signal which is modulated by using the pulse width modulation and output from the control device 18.

For example, each PDU 15 or 16 converts a direct current power supplied from the battery 17 (a storage device) into a three phase alternate current power, based on a gate signal (that is, a PWM signal) which is a switching command output from the control device 18, when the motor for power generation 12 or the motor for travel 14 performs the power running, and conducts each phase current of the alternate current by sequentially conducting the current to each phase coil of the motor for power generation 12 or each phase coil of the motor for travel 14.

On the other hand, for example, when the motor for power generation 12 or the motor for travel 14 performs the power generation driving, each PDU 15 or 16 converts the generated power of the alternate current output from the motor for power generation 12 or the motor for travel 14 into the direct current power, according to the synchronized gate signal based on a rotation angle of the motor for power generation 12 or the motor for travel 14, which is output from the control device 18.

Each PDU 15 or 16 enables a mutual power transmission and reception between the motor for power generation 12 and the motor for travel 14, in addition to the power transmission and reception between each motor 12 or 14 and the battery 17, and for example, enables a supply of the generated power output from the motor for power generation 12 to the motor for travel 14 that performs the power running, using the driving force of the internal combustion engine 11.

The control device 18 controls driving states of the internal combustion engine 11 and each motor 12 or 14, and a state of the hybrid vehicle 1.

For example, the control device 18 controls the driving (electrical conduction) of the motor for power generation 12 through the GENPDU 15, and controls the driving (electrical conduction) of the motor for travel 14 through the MOTPDU 16. In addition, for example, a fuel supply to the internal combustion engine 11 or ignition timing or the like is controlled.

Furthermore, the control device 18 performs a control of surveillance, protection and the like of the battery 17, and calculates a remaining capacity of the battery 17, based on each detection signal of, for example, a voltage, a current, a temperature of the battery 17, and used time and the like of the battery 17.

In addition, for example, the remaining capacity of the battery 17 is calculated by adding and subtracting an accumulated charge amount and an accumulated discharge amount to and from the remaining capacity in an unloaded state of the battery 17 without degradation, such as its initial state, or otherwise, for example, is obtained by performing a map search using an estimated open-circuit voltage of the current battery 17 which is estimated based on the voltage, the current, and the temperature, with respect to a map indicating a predetermined correlation between the voltage (the open-circuit voltage) and the remaining capacity in the unloaded state of the battery 17 without the degradation, such as its initial state.

Therefore, detection signals output from various sensors which detect a state amount related to states of the internal combustion engine 11, each motor 12 or 14, each PDU 15 or 16, and the battery 17, detection signals output from various sensors which detect a state amount related to a travel state of the hybrid vehicle 1, and signals and the like which are output from various switches are input to the control device 18.

For example, detection signals output from a rotation sensor which detects a rotation angle of each motor 12 or 14, a sensor 19 (the state detection unit) which detects the state amount (for example, the voltage, the current, the temperature, the used time or the like) related to the state of the battery 17, an accelerator open-degree sensor 20 (a required driving force detection unit) which detects a stroke amount (accelerator open-degree) of an accelerator pedal, which is caused by accelerator pedal stepping according to the required driving force of a driver, a vehicle speed sensor which detects a speed of the hybrid vehicle 1, and the like are input to the control device 18.

In addition, for example, during vehicle stop, EV travel, vehicle deceleration or the like, in a state where an output of the internal combustion engine 11 is zero, the control device 18 diagnoses the vehicle state such as an exhaust gas control situation of the internal combustion engine 11.

For example, the control device 18 diagnoses the vehicle state in a state where the output of the internal combustion engine 11 is zero in such a manner that the internal combustion engine 11 is driven, by the driving force output from the motor for power generation 12 during the vehicle stop, or by the driving force output from the motor for power generation 12 or the motor for travel 14 during the EV travel, or otherwise by the driving force transmitted from the driving wheels W during the vehicle deceleration.

Then, when the vehicle state is diagnosed, in a case where the required driving force with a predetermined lower limit value (that is, a lower limit value of the required driving force required for starting the travel of the stopped hybrid vehicle 1) or more is detected (when switched from a vehicle stop state to a vehicle start state, when switched from a vehicle deceleration regeneration state to a power running state, when the required driving force is increased during the EV travel, or the like), based on the detection signal or the like output from the accelerator open-degree sensor 20, the control device 18 calculates the state (at least the remaining capacity, temperature, degradation degree or the like) of the battery 17 based on the detection signal output from the sensor 19 which detects a state amount (for example, the voltage, current, temperature, used time or the like) related to the state (at least the remaining capacity, temperature, degradation degree or the like) of the battery 17, and calculates the remaining time required until the diagnostic completion.

Then, the control device 18 determines whether or not to continue the diagnosis of the vehicle state, based on the state of the battery 17 and the remaining time required until the diagnostic completion.

Figure 2A:
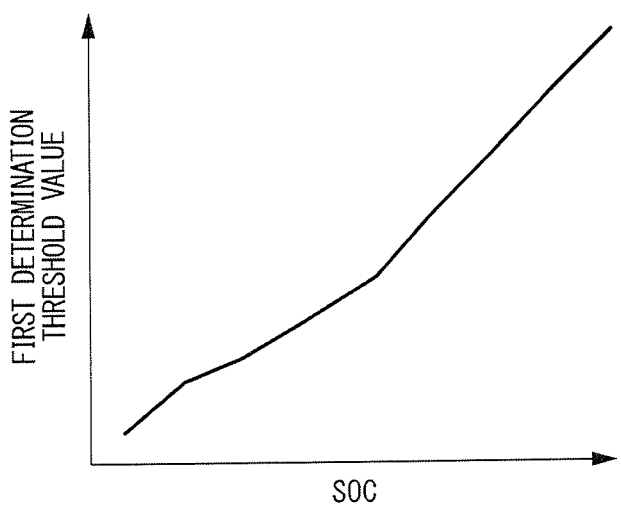
FIG. 2A is a view illustrating an example of correspondence relationship between a remaining amount of a battery and a first determination threshold value according to the diagnostic apparatus of the hybrid vehicle.

More specifically, for example as illustrated in FIG. 2A, the control device 18 stores a first map which is previously created and indicates a predetermined correspondence relationship between the remaining capacity SOC of the battery 17 and a first determination threshold value with respect to the required driving force.

In addition, for example, the first map is set so that the first determination threshold value may be changed in an increasing tendency, according to an increment in the remaining capacity SOC.

Figure 2B:
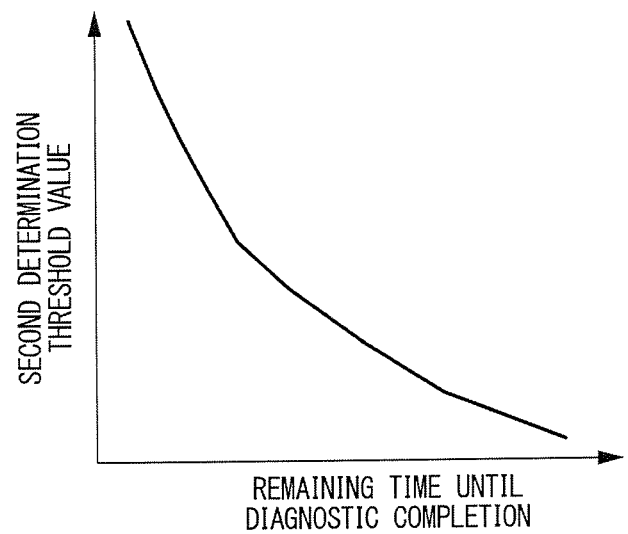
FIG. 2B is a view illustrating an example of correspondence relationship between a remaining time until diagnostic completion and a second determination threshold value according to the diagnostic apparatus of the hybrid vehicle.

In addition, for example as illustrated in FIG. 2B, the control device 18 stores a second map which is previously created and indicates a predetermined correspondence relationship between the remaining time required until the diagnostic completion (a diagnostic completion remaining time) and a second determination threshold value related to the required driving force.

In addition, for example, the second map is set so that the second determination threshold value may be changed in a decreasing tendency, according to an increment in the diagnostic completion remaining time.

Then, the control device 18 acquires the first determination threshold value by map search based on the calculated remaining capacity SOC of the battery 17, acquires the second determination threshold value by the map search based on the calculated diagnostic completion remaining time, and calculates the determination threshold value (for example, any smaller one of the first determination threshold value and the second determination threshold value, an average value of first determination threshold value and the second determination threshold value, or the like) according to the first determination threshold value and the second determination threshold value.

Figure 3A:
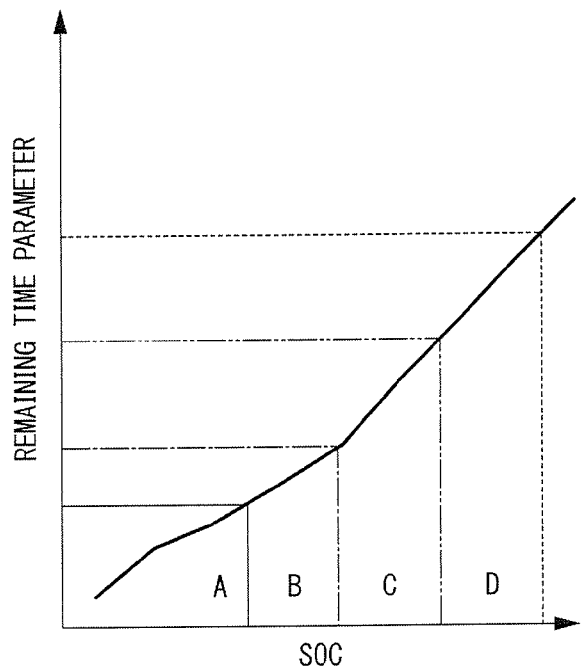
FIG. 3A is a view illustrating an example of correspondence relationship between a remaining amount of a battery and a remaining time parameter according to the diagnostic apparatus of the hybrid vehicle.
Figure 3B:
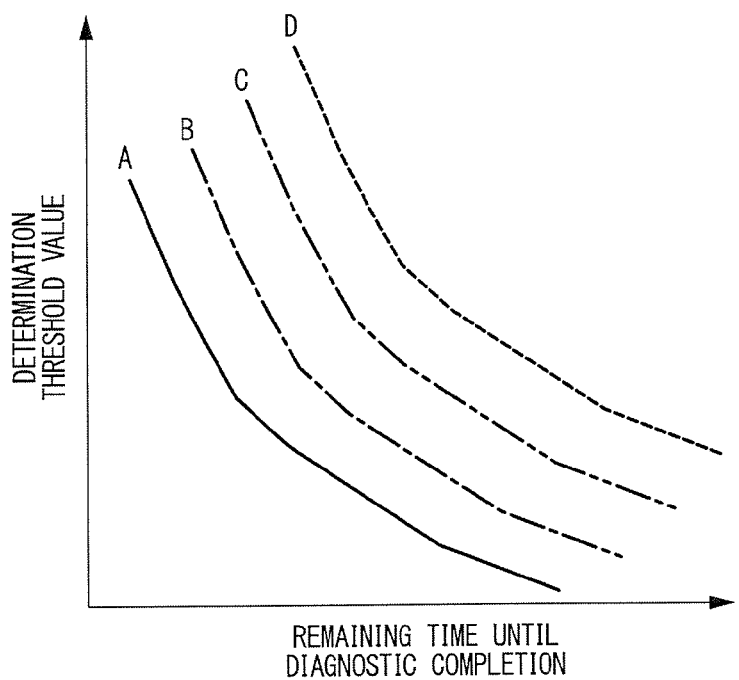
FIG. 3B is a view illustrating an example of correspondence relationship between a remaining amount until diagnostic completion and a second determination threshold value according to the diagnostic apparatus of the hybrid vehicle.

In addition, the control device 18 may store a third and fourth maps illustrated in FIGS. 3A and 3B, for example, instead of the first and second maps illustrated in FIGS. 2A and 2B, for example, and may acquire the determination threshold value with respect to the required driving force from the third and fourth maps.

For example, the third map illustrated in FIG. 3A indicates a predetermined correspondence relationship between the remaining capacity SOC of the battery 17, and a remaining time parameter related to the diagnostic completion remaining time and is set so that the remaining time parameter may be changed in the increasing tendency, according to the increment of the remaining capacity SOC. Accordingly multiple areas (for example, such as areas A to D) are set with respect to the remaining time parameter, corresponding to the multiple areas set with respect to the remaining capacity SOC.

Then, for example, the fourth map illustrated in FIG. 3B indicates a predetermined correspondence relationship between the diagnostic completion remaining time and the determination threshold values with respect to the required driving force, for the multiple areas (for example, such as areas A to D) with respect to the remaining time parameter and is set so that the determination threshold value may be changed in the decreasing tendency, according to the increment in the diagnostic completion remaining time, for example.

Then, the control device 18 acquires the area (for example, any one of the areas A to D) set with respect to the remaining time parameter using the map search based on the calculated remaining capacity SOC of the battery 17, and acquires the determination threshold value using the map search based on the calculated diagnostic completion remaining time and the area of the remaining time parameter.

Then, for example, when the vehicle state is diagnosed, in a case where the required driving force with the determination threshold value or less is detected, based on the detection signal output from the accelerator open-degree sensor 20, the control device 18 causes the motor for travel 14 which is driven only by the storage power of the battery 17 to output the driving force according to the required driving force, and continues the diagnosis of the vehicle state.

On the other hand, in a case where the required driving force with the determination threshold value or more is detected, the control device 18 stops the diagnosis of the vehicle state.

The control device 18, as illustrated in Table 1 below, includes an operation mode of the diagnosis during the vehicle stop, an operation mode of the diagnosis during the EV travel, and an operation mode of the diagnosis stop during the (EV) travel, as an operation mode related to the operation which diagnoses the vehicle state of the hybrid vehicle 1.

TABLE 1

|  |  | CL |
|---|---|---|
| Diagnosis during vehicle stop | Motoring ENG using GEN | OFF |
| Diagnosis during EV travel | EV travel using MOT and motoring ENG using GEN | OFF |
| Diagnosis stop during (EV) travel | EV travel using MOT (and power generation of GEN: series) Start ENG using MOT or driving wheels W (parallel or ENG driving) | ON |

For example, the operation mode of the diagnosis during the vehicle stop is a mode in which the vehicle state is diagnosed in a state where the output of the internal combustion engine 11 is zero, in the stop state of the hybrid vehicle 1.

In the operation mode, the motor for travel 14 is in the stop state, the clutch 13 is in a separation state where a power transmission between the rotation shaft 12a of the motor for power generation 12 and the driving wheels W is in a cutoff state, the internal combustion engine 11 is driven (motoring) by the driving force output from the motor for power generation 12 which performs the power running. Thus the fuel supply and the ignition are not performed.

In addition, for example, the operation mode of the diagnosis during the EV travel is a mode in which during the EV travel of the hybrid vehicle 1, that is, the motor for travel 14 is driven only by the storage power of the battery 17, and during the travel where the driving force output from the motor for travel 14 is transmitted to the driving wheels W, the vehicle state is diagnosed in the state where the output of the internal combustion engine 11 is zero.

In the operation mode, the motor for travel 14 performs the power running, the driving force output from the motor for travel 14 is transmitted to the driving wheels W, the clutch 13 is in the separation state where the power transmission between the rotation shaft 12a of the motor for power generation 12 and the driving wheels W is in the cutoff state, the internal combustion engine 11 is driven (motoring) by the driving force output from the motor for power generation 12 which performs the power running, and thereby the fuel supply and the ignition are not performed.

In addition, for example, the operation mode of the diagnosis stop during the (EV) travel is a mode in which the diagnosis of the vehicle state is stopped, during the EV travel of the hybrid vehicle 1 or during the travel of the ENG driving which transmits the driving force output from the internal combustion engine 11 to the driving wheels W.

In the operation mode, the EV travel, or otherwise a series travel or otherwise a parallel travel, or otherwise a state of the ENG driving is selected.

In the EV travel or the series travel, the motor for travel 14 performs the power running, the driving force output from the motor for travel 14 is transmitted to the driving wheels W, the clutch 13 is in the separation state where the power transmission between the rotation shaft 12a of the motor for power generation 12 and the driving wheels W is in the cutoff state, the internal combustion engine 11 performs the power output in the series travel, and the motor for power generation 12 is in a state where the power generation driving is performed by the driving force output from the internal combustion engine 11.

In the parallel travel, the motor for travel 14 performs the power running, the driving force output from the motor for travel 14 is transmitted to the driving wheels W, the clutch 13 is in the connection state which enables the power transmission between the rotation shaft 12a of the motor for power generation 12 and the driving wheels W.

Then, the internal combustion engine 11 is started by the driving force output from the motor for travel 14 or the driving force transmitted from the driving wheels W side, performs the power output while rotating the motor for power generation 12 and is in a state where the driving force output from the started internal combustion engine 11 is transmitted to the driving wheels W.

In the ENG driving, the motor for travel 14 is in the stop state after at least the internal combustion engine 11 is started, the clutch 13 is in the connection state which enables the power transmission between the rotation shaft 12a of the motor for power generation 12 and the driving wheels W and is in the state where the driving force output from the started internal combustion engine 11 is transmitted to the driving wheels W.

The diagnostic apparatus 10 of the hybrid vehicle according to the present embodiment includes the above-described configuration, and next, the operation of the diagnostic apparatus 10 of the hybrid vehicle will be described.

Figure 4:
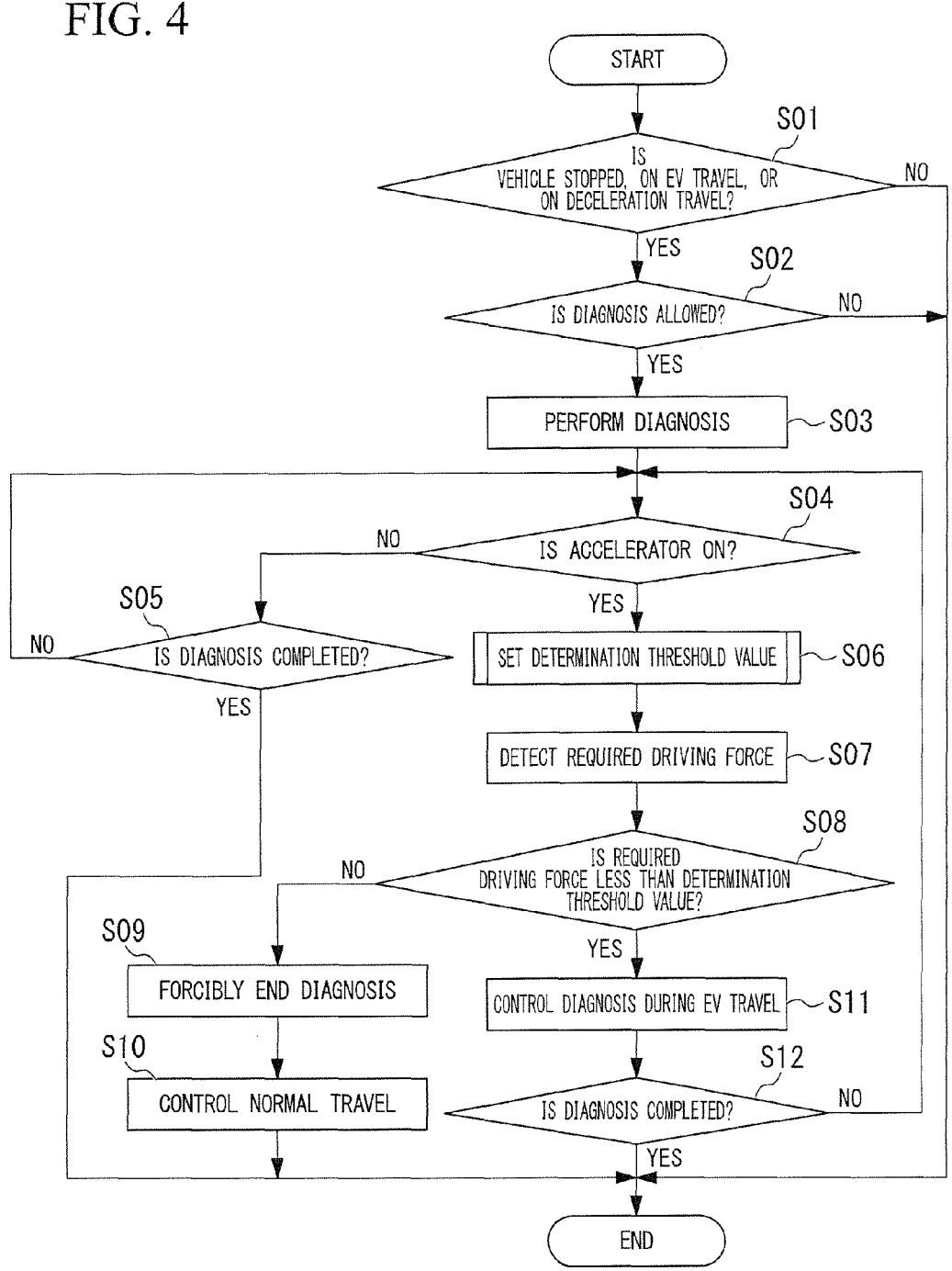
FIG. 4 is a flow chart illustrating an operation of the diagnostic apparatus of the hybrid vehicle, especially an operation determination process.

First, for example, in step S01 illustrated in FIG. 4, it is determined whether or not the vehicle is stopped and whether there is a high possibility that the vehicle may be stopped (for example, when the brake device is operated or in a case where the speed is a predetermined speed (for example, 5 km/h or the like) or less), it is determined whether or not the vehicle is in the EV travel or whether or not the vehicle is in the deceleration travel.

In a case where the determination result is "NO", the process proceeds to the end.

On the other hand, in a case where the determination result is "YES", the process proceeds to step S02.

In addition, in step S02, for example, it is determined whether or not the remaining capacity of the battery 17 is the predetermined value or more, whether or not the temperature of the coolant of the internal combustion engine 11 is a predetermined temperature or more, whether or not the temperature of a catalyst provided in an exhaust system of the internal combustion engine 11 is the predetermined temperature or more, whether or not the diagnostic performance is continued, and the like, and thereby it is determined whether or not the diagnostic performance of the vehicle state is allowed.

In a case where the determination result is "NO", the process proceeds to the end.

On the other hand, in a case where the determination result is "YES", the process proceeds to step S03 (a diagnostic unit).

In addition, the case where the diagnostic performance of the vehicle state is allowed corresponds to a state where the EV travel is operable and a proper driving of the internal combustion engine 11 is operable in such a state after completing warm-up driving.

Next, in step S03, the diagnosis of the vehicle state is performed.

Next, in step S04, it is determined whether or not it is in an ON state of the accelerator where the required driving force with the predetermined lower limit value or more is detected, by the driver pressing or increasingly pressing on the accelerator pedal.

In a case where the determination result is "YES", the process proceeds to step S06 to be described later.

On the other hand, in a case where the determination result is "NO", the process proceeds to step S05.

Then, in step S05, it is determined whether or not the diagnosis is completed. In a case where the determination result is "YES", the process proceeds to the end.

On the other hand, in a case where the determination result is "NO", the process returns to the above-described step S04.

In addition, in step S06, a process of a determination threshold value setting to be described later is performed.

Next, in step S07, the required driving force of the driver is detected, based on the detection signal output from the accelerator open-degree sensor 20.

Next, in step S08 (the determination unit), it is determined whether or not the required driving force is the determination threshold value or less.

In a case where the determination result is "NO", the process proceeds to step S09.

On the other hand, in a case where the determination result is "YES", the process proceeds to step S11 to be described.

Then, in step S09, the diagnosis of the vehicle state is forcibly ended.

Then, in step S10, a general travel control (for example, the travel control which performs the operation mode of the diagnosis stop during the (EV) travel, such as the travel control which enables the power output from the internal combustion engine 11 according to the required driving force, without performing the diagnosis of the vehicle state) is performed, and the process proceeds to the end.

In addition, in step S11, an operation mode of the diagnosis during the EV travel is performed.

Next, in step S12, it is determined whether or not the diagnosis is completed. In a case where the determination result is "YES", the process proceeds to the end.

On the other hand, in a case where the determination result is "NO", the process returns to the above-described step S04.

Hereinafter, the process of the determination threshold value setting in the above-described step S06 will be described by using FIG. 5 as an example.

Figure 5:
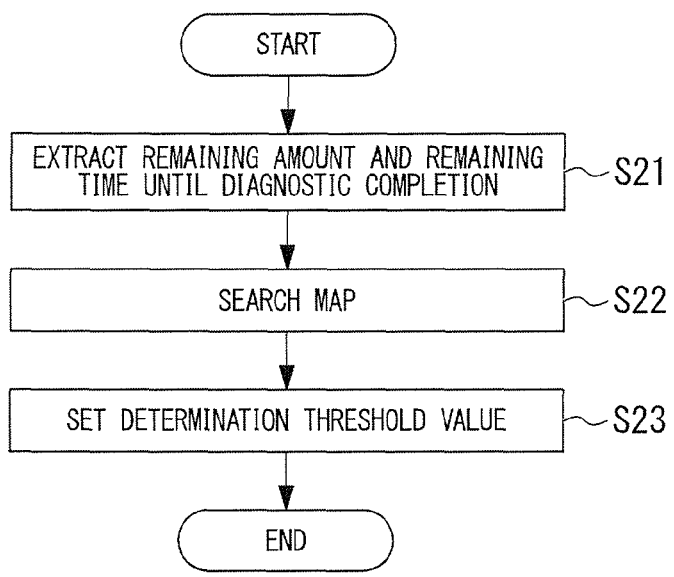
FIG. 5 is a flow chart illustrating a setting process of the determination threshold value illustrated in FIG. 4.

First, in step S21 (the remaining time acquisition unit) illustrated in FIG. 5, the remaining capacity SOC of the battery 17 is calculated based on the detection signal output from the sensor 19 which detects the state amount (for example, the voltage, the current, the temperature, the used time or the like) related to the state (at least the remaining capacity, the temperature, the degradation degree or the like) of the battery 17, and the remaining time (the diagnostic completion remaining time) required until the diagnostic completion is calculated.

Next, in step S22, the first map and the second map, or the third map and the fourth map are map-searched, based on the remaining capacity SOC and the diagnostic completion remaining time.

Next, in step S23, the determination threshold value with respect to the required driving force is set, based on the search result of the map search.

As described above, according to the diagnostic apparatus 10 of the hybrid vehicle and the diagnostic method of the hybrid vehicle of the present embodiment, since the required driving force with the predetermined lower limit value or more is detected when the vehicle state is diagnosed in the state where the output of the internal combustion engine 11 is zero, in a case where the hybrid vehicle 1 travels by transmitting the driving force output from the motor for travel 14 to the driving wheels W, it is determined whether or not to continue the diagnosis, by a complex determination based on the state (at least the remaining capacity, the temperature, the degradation degree or the like) of the battery 17 and the remaining time required until the diagnostic completion.

Figure 6:
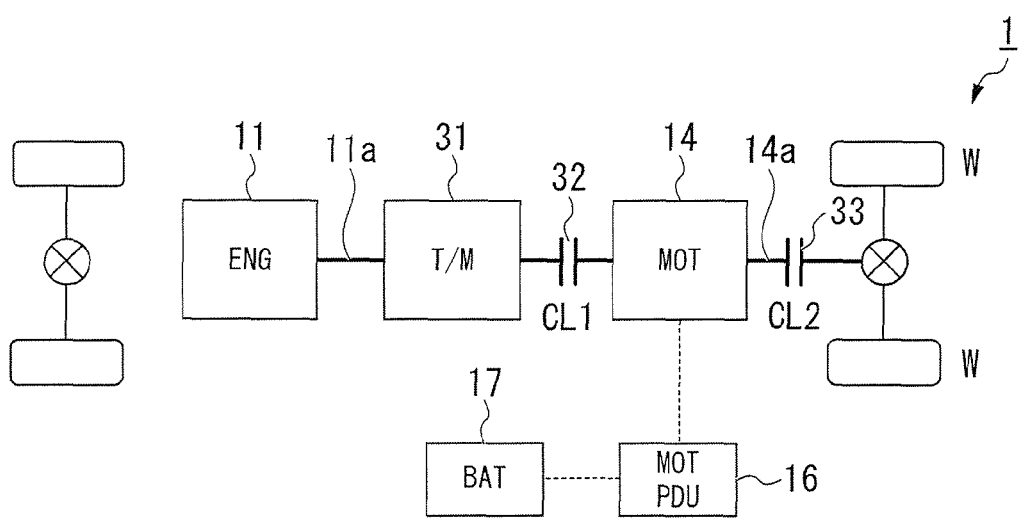
FIG. 6 is a configuration diagram of the diagnostic apparatus of the hybrid vehicle according to a first modification example of the embodiment of the present invention.

In addition, in the above-described embodiment, as is a first modification example illustrated in FIG. 6, the hybrid vehicle 1 may be the hybrid vehicle in which the crank shaft 11a of the internal combustion engine (ENG) 11 is connected to one end of the rotation shaft 14a of the motor for travel (MOT) 14 through a transmission (T/M) 31 and a first clutch (CL1) 32, and the other end of the rotation shaft 14a of the motor for travel (MOT) 14 is connected to the driving wheels W through a second clutch (CL2) 33.

The operation mode of the first modification example related to the operation which diagnoses the vehicle state of the hybrid vehicle 1 is described as illustrated in the following Table 2, for example.

TABLE 2

|  |  | CL1 | CL2 |
|---|---|---|---|
| Diagnosis during vehicle stop | Motoring ENG using MOT | ON | OFF |
| Diagnosis during EV travel | EV travel using MOT and motoring ENG | ON | ON |
| Diagnosis stop during (EV) travel | EV travel using MOT | OFF | ON |
|  | Start ENG using MOT (parallel or ENG driving) | ON | ON |

For example, in the operation mode of the diagnosis during the vehicle stop, the first clutch 32 is in the connection state where the power transmission is possible between the rotation shaft 14a of the motor for travel 14 and the crank shaft 11a of the internal combustion engine 11, the second clutch 33 is in the separation state where the power transmission between the rotation shaft 14a of the motor for travel 14 and the driving wheels W is in the cutoff state, and the internal combustion engine 11 is driven (motoring) by the driving force output from the motor for travel 14 which performs the power running, and thereby the fuel supply and the ignition are not performed.

In addition, for example, in the operation mode of the diagnosis during the EV travel, the first clutch 32 and the second clutch 33 are in the connection state, the driving force output from the motor for travel 14 which performs the power running is transmitted to the internal combustion engine 11 and the driving wheels W, the internal combustion engine 11 is driven (motoring) by the driving force output from the motor for travel 14 which performs the power running, and thereby the fuel supply and the ignition are not performed.

In addition, for example, during the EV travel of the hybrid vehicle 1 or during the travel of the ENG driving in which the driving force output from the internal combustion engine 11 is transmitted to the driving wheels W, the operation mode of the diagnosis stop during the travel (EV) is a mode which stops the diagnosis of the vehicle state.

In the operation mode, the EV travel or otherwise the parallel travel or the state of the ENG driving is selected.

In the EV travel, the motor for travel 14 does not perform the power running, the first clutch 32 is in the separation state and the second clutch 33 is in the connection state, and thereby the driving force output from the motor for travel 14 is transmitted to the driving wheels W.

In the parallel travel, the first clutch 32 and the second clutch 33 is in the connection state, the driving force output from the motor for travel 14 which performs the power running is transmitted to the internal combustion engine 11 and the driving wheels W, the internal combustion engine 11 performs the power output by being started by the driving force output from the motor for travel 14 which performs the power running, and thereby the driving force output from the internal combustion engine 11 is transmitted to the driving wheels W.

In the ENG driving, the first clutch 32 and the second clutch 33 are in the connection state, the motor for travel 14 is in the stop state after at least the internal combustion engine 11 is started, and thereby the driving force output from the started internal combustion engine 11 is transmitted to the driving wheels W.

Figure 7:
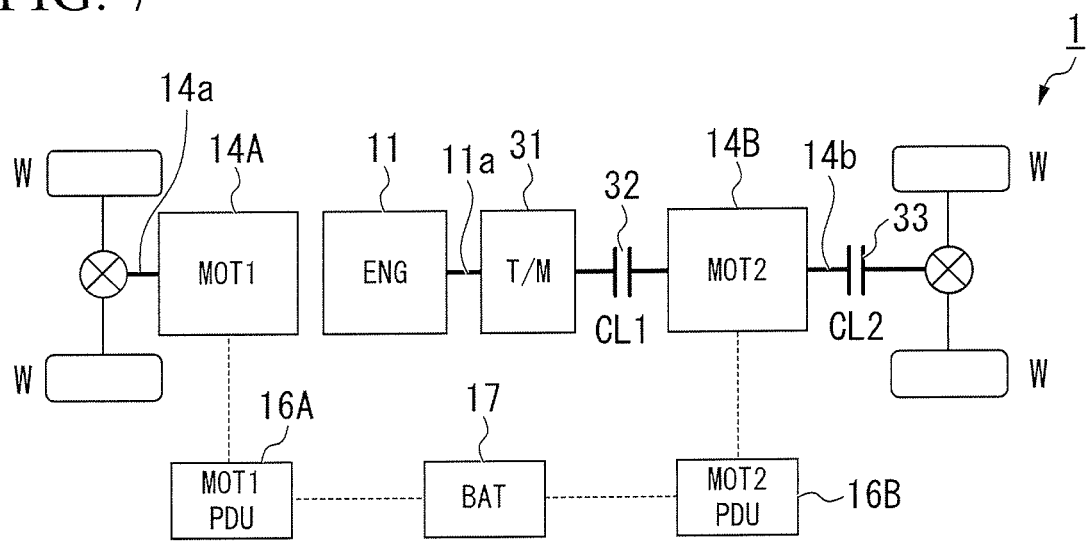
FIG. 7 is a configuration diagram of the diagnostic apparatus of the hybrid vehicle according to a second modification example of the embodiment of the present invention.

In addition, in the above-described embodiment, for example, as is a second modification example illustrated in FIG. 7, the hybrid vehicle 1 may be the hybrid vehicle in which the rotation shaft 14a of the motor for travel (MOT 1) 14A whose driving (conduction) is controlled by a first MOT1PDU 16A is connected to one driving wheel W of the front wheel and the rear wheel, one end of a rotation shaft 14b of a second motor for travel (MOT2) 14B whose driving (conduction) is controlled by a second MOT2PDU 16B through the transmission (T/M) 31 and the first clutch (CL1) 32 is connected to the crank shaft 11a of the internal combustion engine (ENG) 11, and the other end of the rotation shaft 14b of the second motor for travel (MOT2) 14B is connected to the driving wheels W through the second clutch (CL2) 33.

The operation mode related to the operation which diagnoses the vehicle state of the hybrid vehicle 1 of the second modification example is described as illustrated in the following Table 3, for example.

TABLE 3

| | | CL1 | CL2 |
|---|---|---|---|
| Diagnosis during vehicle stop | Motoring ENG using MOT2 | ON | OFF |
| Diagnosis during EV travel | EV travel using MOT1 and motoring ENG using MOT2 or driving wheels W | ON | OFF ON |
| Diagnosis stop during (EV) travel | EV travel using MOT1 SeriesON parallel or ENG driving | OFF ON | OFF OFF ON |

For example, in the operation mode of the diagnosis during the vehicle stop, the first clutch 32 is in the connection state where the power transmission is possible between the rotation shaft 14b of the second motor for travel 14B and the crank shaft 11a of the internal combustion engine 11, and the second clutch 33 is in the separation state where the power transmission between the rotation shaft 14b of the second motor for travel 14B and the driving wheels W is in the cutoff state. The internal combustion engine 11 is driven (motoring) by the driving force output from the second motor for travel 14B which performs the power running, and thereby the fuel supply and the ignition are not performed.

In addition, for example, in the operation mode of the diagnosis during the EV travel, the first clutch 32 is in the connection state and the second clutch 33 is in the separation state or in the connection state, the driving force output from the first motor for travel 14A (motor) which performs the power running is transmitted to one driving wheel W of the front wheel and the rear wheel, the internal combustion engine 11 is driven (motoring) by the driving force output from the second motor for travel 14B which performs the power running or by the driving force transmitted from the other driving wheel W side of the front wheel and the rear wheel, and thereby the fuel supply and the ignition are not performed.

In addition, in the connection state of the second clutch 33, the driving force output from the second motor for travel 14B which performs the power running may be transmitted to the other driving wheel W of the front wheel and the rear wheel.

In addition, for example, during the EV travel of the hybrid vehicle 1 or during the travel of the ENG driving in which the driving force output from the internal combustion engine 11 is transmitted to the driving wheels W, the operation mode of the diagnosis stop during the (EV) travel is a mode which stops the diagnosis of the vehicle state.

In the operation mode, the EV travel, or otherwise the series travel or the parallel travel, or otherwise the state of the ENG driving is selected.

In the EV travel, the driving force output from the first motor for travel 14A which performs the power running is transmitted to one driving wheel W of the front wheel and the rear wheel, and thereby the first clutch 32 and the second clutch 33 are in the separation state.

In the series travel, the driving force output from the first motor for travel 14A which performs the power running is transmitted to one driving wheel W of the front wheel and the rear wheel, the first clutch 32 is in the connection state, and the second clutch 33 is in the separation state.

Then, the internal combustion engine 11 is started by the driving force output from the second motor for travel 14B or by the driving force transmitted from the other driving wheel W side of the front wheel and the rear wheel, performs the power output while rotating the second motor for travel 14B, and thereby the second motor for travel 14B performs the power generation driving using the driving force output from the stated internal combustion engine 11.

In the parallel travel, the driving force output from the first motor for travel 14A which performs the power running is transmitted to one driving wheel W of the front wheel and the rear wheel, and the first clutch 32 and the second clutch 33 are in the connection state.

Then, the internal combustion engine 11 is started by the driving force output from the second motor for travel 14B or by the driving force transmitted from the other driving wheel W side of the front wheel and the rear wheel, performs the power output while rotating the second motor for travel 14B, and thereby the driving force output from the started internal combustion engine 11 is transmitted to the other driving wheel W of the front wheel and the rear wheel.

In the ENG driving, the first clutch 32 and the second clutch 33 are in the connection state, the first motor for travel 14A is in the stop state after at least the internal combustion engine 11 is started, and thereby the driving force output from the started internal combustion engine 11 is transmitted to the other driving wheel W of the front wheel and the rear wheel.

(2) In the above embodiment, a required driving force detection unit that detects a required driving force of a driver is provided, and the determination unit may acquire a first determination threshold value with respect to the required driving force according to the state of the electricity storage device detected by the state detection unit, and acquire a second determination threshold value with respect to the required driving force according to the remaining time acquired by the remaining time acquisition unit, and determine to continue the diagnosis of the vehicle state using the diagnostic unit, in a case where the required driving force with the determination threshold value or less is detected by the required driving force detection unit according to the first determination threshold value and a second determination threshold value.

(3) In the above embodiment, a required driving force detection unit that detects a required driving force of a driver is provided, and the determination unit may acquire a parameter with respect to the remaining time according to the state of the electricity storage device detected by the state detection unit, and acquire a determination threshold value with respect to the required driving force according to the remaining time acquired by the remaining time acquisition unit and the parameter, and determine to continue the diagnosis of the vehicle state using the diagnostic unit, in a case where the required driving force with the determination threshold value or less is detected by the required driving force detection unit.

(4) In the above embodiments, the control unit may stop the diagnosis of the vehicle state using the diagnostic unit, when the vehicle state is diagnosed by the diagnostic unit, in a case where the required driving force greater than the determination threshold value is detected by the required driving force detection unit.

(5) In the above embodiments, the diagnostic unit may diagnose the vehicle state in a state where the internal combustion engine is driven by the driving force output from the motor during vehicle stop.

(6) In the above embodiments, the diagnostic unit may diagnose the vehicle state in a state where the internal combustion engine is driven by the driving force transmitted from a driving wheel during vehicle deceleration.

(7) In the above embodiments, the diagnostic unit may diagnose the vehicle state in a state where the internal combustion engine is driven by the driving force output from the motor during EV travel using the motor.

According to the aspect of (2), a determination threshold value with respect to the required driving force for determining whether or not to continue the diagnosis when the vehicle state is diagnosed by the diagnostic unit in a state where the output of the internal combustion engine is zero in a case where the required driving force is detected by a required driving force detection unit, is a value according to a first determination threshold value according to the state of the storage device, and according to a second determination threshold value according to the remaining time required until the diagnostic completion. Therefore, it is possible to properly determine whether or not to continue the diagnosis, using a complex and easy determination based on the state of the storage device (at least the remaining amount, the temperature, the degradation degree, or the like) and the remaining time required until the diagnostic completion.

According to the aspect of (3), the determination threshold value with respect to the required driving force for determining whether or not to continue the diagnosis when the vehicle state is diagnosed by the diagnostic unit in a state where the output of the internal combustion engine is zero in a case where the required driving force is detected by the required driving force detection unit, is a value according to a parameter with respect to the remaining time and the remaining time required until the diagnostic completion which are according to the state of the storage device. Therefore, it is possible to properly determine whether or not to continue the diagnosis, using the complex and easy determination based on the state of the storage device (at least the remaining amount, the temperature, the degradation degree, or the like) and the remaining time required until the diagnostic completion.

In case of (4) and where the required driving force greater than a determination threshold value is detected by the required driving force detection unit when the vehicle state is diagnosed by the diagnostic unit in a state where the output of the internal combustion engine is zero, the diagnosis is stopped without being continued, and the output according to the required driving force is ensured by starting the power output from the internal combustion engine. Therefore, it is possible to ensure the desired merchantability.

In case of (5), the internal combustion engine is driven by the driving force output from the motor, whereby the diagnostic unit diagnoses the vehicle state in a state where the output of the internal combustion engine is zero. Therefore, the internal combustion engine can be driven by a storage power of the storage device, and the vehicle state can be properly diagnosed even during vehicle stop. Furthermore, motoring of the internal combustion engine is performed by the motor during the vehicle stop, whereby even when it is transited from a vehicle stop state to a vehicle start state in a case where the required driving force from the driver is present when the diagnosis of the vehicle state is performed, the driving force for the vehicle travel is output by the motor, and the motoring of the internal combustion engine using the motor is continued. Accordingly, necessity for the re-diagnosis can be prevented from occurring at the time of the next diagnosis.

In the case of (6), the internal combustion engine is driven by the driving force transmitted from driving wheels during vehicle deceleration, whereby the diagnostic unit diagnoses the vehicle state in a state where the output of the internal combustion engine is zero. Therefore, energy consumption required for driving the internal combustion engine can be prevented from increasing. Furthermore, the internal combustion engine is driven by the driving force transmitted from the driving wheels during the vehicle deceleration, whereby even though there is the driving force requirement from the driver when the vehicle state diagnosis is performed, the driving force for the vehicle travel is output by the motor, and the driving of the internal combustion engine is continued by motoring the internal combustion engine using the motor. Therefore, the necessity for the re-diagnosis can be prevented from occurring at the time of the next diagnosis.

In the case of (7), even in a case where there is the driving force requirement from the driver when the vehicle state diagnosis is performed by motoring the internal combustion engine using the motor during the EV travel, the driving force for the vehicle travel is output by the motor, and the motoring of the internal combustion engine using the motor is continued. Therefore, the necessity for the re-diagnosis can be prevented from occurring at the time of the next diagnosis.

INDUSTRIAL APPLICABILITY

According to the present invention, the diagnostic apparatus and the diagnostic method of the hybrid vehicle can be provided in which the energy consumption required for the vehicle diagnosis is prevented from increasing, and the distraction to the occupant can be prevented from increasing due to the diagnostic performance.

REFERENCE SIGNS LIST 1 hybrid vehicle
10 diagnostic apparatus of hybrid vehicle
11 internal combustion engine
12 motor for power generation
14 motor for travel (motor)
14A first motor for travel (motor)
14B second motor for travel
17 battery (storage device)
18 control device (diagnostic unit, state detection unit, remaining time acquisition unit, determination unit, control unit, and required driving force detection unit)
19 sensor (state detection unit)
20 accelerator open-degree sensor (required driving force detection unit) step S03 diagnostic unit
step S08 determination unit
step S21 remaining time acquisition unit

The invention claimed is:

1. A diagnostic apparatus of hybrid vehicle comprising:
an internal combustion engine;
an electricity storage device;
a motor that generates a driving force for vehicle travel using at least an electricity storage power of the electricity storage device;
a diagnostic unit that diagnoses a vehicle state in a state where an output of the internal combustion engine is zero;
a state detection unit that detects a state of the electricity storage device;
a remaining time acquisition unit that acquires a remaining time required until a diagnostic completion, when the vehicle state is diagnosed by the diagnostic unit;
a determination unit that determines whether or not the diagnosis of the vehicle state is continued by the diagnostic unit, when the vehicle state is diagnosed by the diagnostic unit, based on the state of the electricity storage device detected by the state detection unit and the remaining time acquired by the remaining time acquisition unit; and
a control unit that controls continuation or stop of the vehicle state diagnosis according to a determination result of the determination unit.

2. The diagnostic apparatus of the hybrid vehicle according to claim 1, further comprising:
a required driving force detection unit that detects a required driving force of a driver,
wherein the determination unit acquires a first determination threshold value with respect to the required driving force according to the state of the electricity storage device detected by the state detection unit, and acquires a second determination threshold value with respect to the required driving force according to the remaining time acquired by the remaining time acquisition unit, and determines to continue the diagnosis of the vehicle state using the diagnostic unit, in a case where the required driving force with a required driving force determination threshold value or less is detected by the required driving force detection unit, the required driving force determination threshold value being acquired according to the first determination threshold value and the second determination threshold value.

3. The diagnostic apparatus of the hybrid vehicle according to claim 2, wherein the control unit stops the diagnosis of the vehicle state using the diagnostic unit, when the vehicle state is diagnosed by the diagnostic unit, in a case where the required driving force greater than the required driving force determination threshold value is detected by the required driving force detection unit.

4. The diagnostic apparatus of the hybrid vehicle according to claim 1, further comprising
a required driving force detection unit that detects a required driving force of a driver,
wherein the determination unit acquires a parameter with respect to the remaining time according to the state of the electricity storage device detected by the state detection unit, and acquires a determination threshold value with respect to the required driving force according to the remaining time acquired by the remaining time acquisition unit and the parameter, and determines to continue the diagnosis of the vehicle state using the diagnostic unit, in a case where the required driving force with the determination threshold value or less is detected by the required driving force detection unit.

5. The diagnostic apparatus of the hybrid vehicle according to claim 4, wherein the control unit stops the diagnosis of the vehicle state using the diagnostic unit, when the vehicle state is diagnosed by the diagnostic unit, in a case where the required driving force greater than the determination threshold value is detected by the required driving force detection unit.

6. The diagnostic apparatus of the hybrid vehicle according to claim 1, wherein the diagnostic unit diagnoses the vehicle state in a state where the internal combustion engine is driven by the driving force output from the motor during vehicle stop.

7. The diagnostic apparatus of the hybrid vehicle according to claim 1, wherein the diagnostic unit diagnoses the vehicle state in a state where the internal combustion engine is driven by the driving force transmitted from a driving wheel during vehicle deceleration.

8. The diagnostic apparatus of the hybrid vehicle according to claim 1, wherein the diagnostic unit diagnoses the vehicle state in a state where the internal combustion engine is driven by the driving force output from the motor during electric vehicle (EV) travel using the motor.

9. A diagnostic method of a hybrid vehicle which includes an internal combustion engine, an electricity storage device, a motor that generates a driving force for a vehicle travel using at least an electricity storage power of the electricity storage device, a diagnostic unit that diagnoses a vehicle state in a state where an output of the internal combustion engine is zero, a state detection unit that detects a state of the electricity storage device, a remaining time acquisition unit that acquires a remaining time required until diagnostic completion, when the vehicle state is diagnosed by the diagnostic unit, a determination unit that determines whether or not the diagnosis of the vehicle state is continued by the diagnostic unit, based on the state of the electricity storage device detected by the state detection unit and the remaining time acquired by the remaining time acquisition unit, when the vehicle state is diagnosed by the diagnostic unit, a control unit that controls a continuation or a stop of the vehicle state diagnosis according to a determination result of the determination unit, and a required driving force detection unit that detects a required driving force of a driver, the method comprising:

- acquiring a parameter with respect to the remaining time according to the state of the electricity storage device detected by the state detection unit;
- acquiring a determination threshold value with respect to the required driving force according to the remaining time acquired by the remaining time acquisition unit and the parameter; and
- determining whether to continue the diagnosis of the vehicle state using the diagnostic unit, in a case where the required driving force with the determination threshold value or less is detected by the required driving force detection unit.

\* \* \* \* \*